Jan. 5, 1926. 1,568,876
N. I. CAMPBELL ET AL
CYLINDRICAL PROTRACTOR
Filed Sept. 4, 1924   2 Sheets-Sheet 1
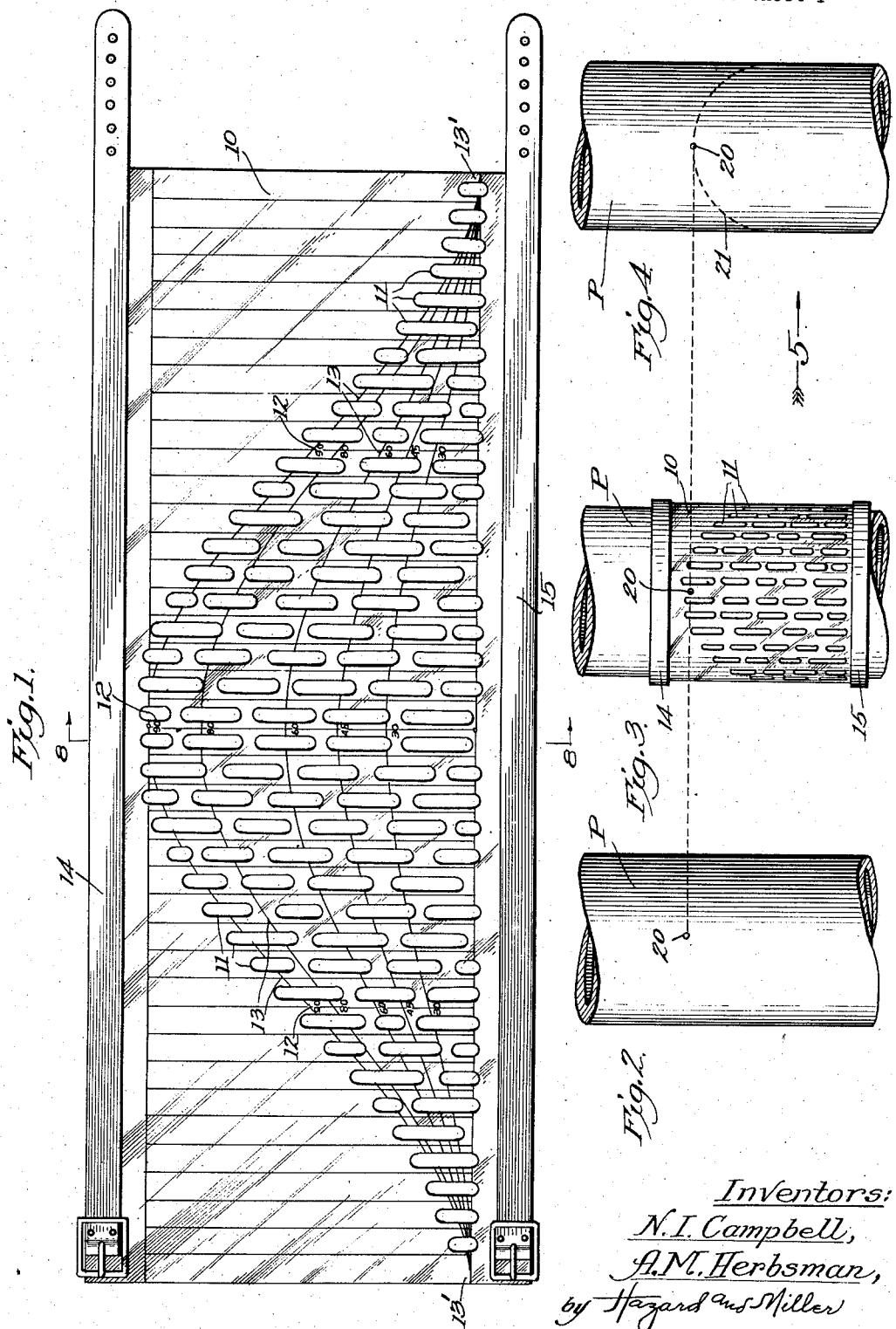
Inventors:
N. I. Campbell,
A. M. Herbsman,
by Hazard and Miller
Attorneys Jan. 5, 1926. 1,568,876
N. I. CAMPBELL ET AL
CYLINDRICAL PROTRACTOR
Filed Sept. 4, 1924  2 Sheets-Sheet 2
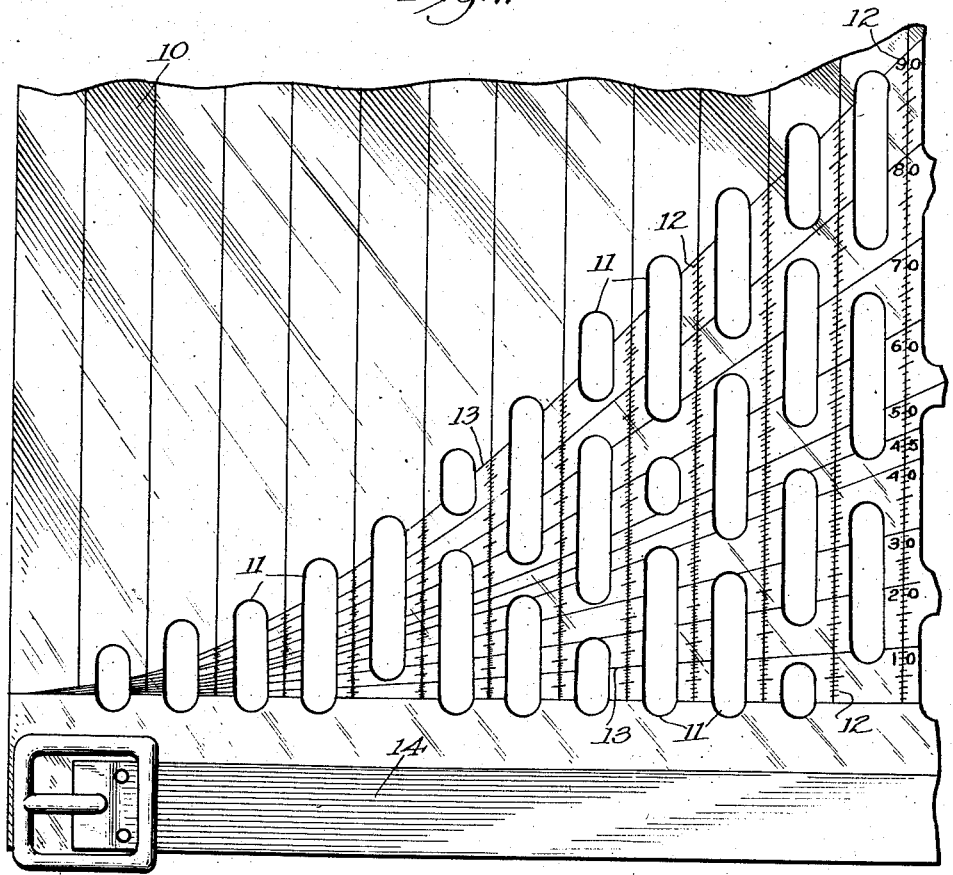
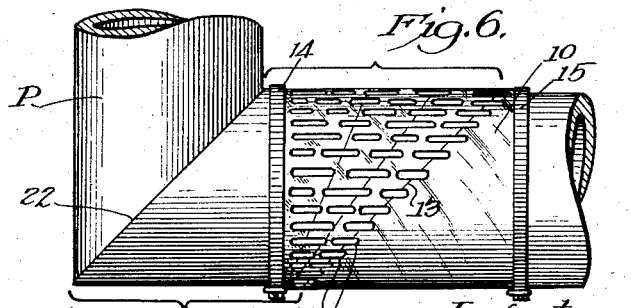
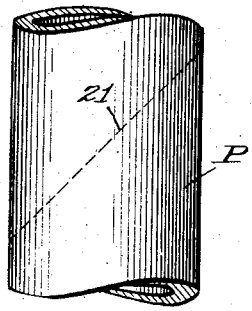
Inventors
N. I. Campbell,
A. M. Herbsman,
by Hazard and Miller
Attorneys Patented Jan. 5, 1926.

1,568,876

UNITED STATES PATENT OFFICE.

NELSON I. CAMPBELL AND ABRAHAM M. HERBSMAN, OF LOS ANGELES, CALIFORNIA.

CYLINDRICAL PROTRACTOR.

Application filed September 4, 1924. Serial No. 735,821.

*To all whom it may concern:*

Be it known that we, NELSON I. CAMPBELL and ABRAHAM M. HERBSMAN, citizens of the United States, residing at Los Angeles, in the county of Los Angeles and State of California, have invented new and useful Improvements in Cylindrical Protractors, of which the following is a specification.

This invention relates to devices adapted to lay out angles upon cylindrical objects, such as pipes, and is an improvement over the device disclosed in our patent application, Serial No. 661,033, filed September 5, 1923.

It is an object of this invention to provide a cylindrical protractor which consists of a flexible sheet of material adapted to be wrapped around cylindrical objects, such as pipes, which has suitable curves marked thereon which will enable any angle from 1° to 90° to be marked or laid out upon the cylindrical object.

It has been our experience that it is very seldom that pipes are cut and joined together at an angle greater than 90° and therefore our protractor is designed for laying out angles only from 1° to 90°.

With the foregoing and other objects in view which will be made manifest in the following detailed description and pointed out in the appended claims, reference is had to the accompanying drawings for an illustrative embodiment of the invention, wherein:

Figure 1 is a top plan view of our improved cylindrical protractor,

Figs. 2, 3 and 4 show the various steps taken in laying out an angle upon a cylindrical object, such as a pipe, when employing our improved protractor, Fig. 5 is a side elevation of the pipe shown in Fig. 4, taken in the direction of the arrow 5 on Fig. 4, Fig. 6 is a side elevation of the pipe shown in Fig. 5 after it has been cut and secured to an adjacent section of pipe to form the desired bend, Fig. 7 is a partial top plan view showing parts of our improved cylindrical protractor upon an enlarged scale, and Fig. 8 is a vertical section taken substantially upon the line 8—8 of Fig. 1.

Referring to the accompanying drawings wherein similar reference characters designate similar parts throughout, our improved cylindrical protractor consists of a flexible sheet of material 10 which is adapted to be wrapped around the cylindrical object upon which it is desired to lay out an angle. This sheet of flexible material 10 may be of any material suitable for the purpose, but we preferably employ transparent celluloid for a purpose to be hereinafter disclosed.

Rows of perforations 11 are formed upon the sheet of material 10 and scales 12 are printed or otherwise formed upon the sheet of material 10 between the vertical rows of perforations 11. Curves 13 are printed or otherwise formed upon the sheet 10 and extend longitudinally thereof. The curves 13 are developments of lines formed upon the exterior surface of a cylinder which is intersected by planes at various angles to the axis of the cylinder from 0 to 90°, these curves 13 being preferably at about 10° intervals. Straps 14 and 15 are secured to the top and bottom edges of the sheet 10 and serve as a securing means for holding the sheet about the cylindrical object upon which the angle is to be laid out.

In Figs. 2, 3 and 4 we have illustrated the method of laying out an angle upon a section of pipe which angle is 90°. The section of pipe P has a center mark punched thereon, as at 20, which indicates the longest element of the section of pipe P to be used. The cylindrical protractor is then wrapped around the pipe P, as in Fig. 3, and shifted so that the top of the 90° curve 13 coincides with the mark 20. A suitable marking element, such as a pencil or a crayon, may then be employed to mark through the perforations 11 on to the pipe, joining the sections of the 90° curve 13 so that when the cylindrical protractor has been removed, as shown in Figs. 4 and 5, a dotted line 21 will be marked upon the pipe P. The dashes of the dotted line 21 may be connected when the protractor is removed, if desired. It will readily be understood that by following the dotted line 21 with a cutting torch or any other suitable cutting instrument, the pipe P will be cut so as to form one section of a bend, as shown in Fig. 6, with the edges 22 accurately cut with respect to the body of the pipe P so as to form a perfect joint.

Obviously if any other angle were to be cut upon the pipe P, such as 60°, the cylindrical protractor would be shifted so that the top of the 60° curve 13 would coincide with the mark 20.

It will readily be appreciated that by forming the sheet 10 of transparent material, the mark 20 may be readily seen therethrough and facilitate the proper positioning of the protractor upon the pipe P.

As shown in Fig. 7, the scales 12 extend vertically between the rows of the perforations 11. These scales 12 subdivide the distance between the curves 13, and, preferably, where the distances between the curves 13 are sufficient, the scales 12 divide the distances into ten parts, mathematically or graphically determined, so that a curve may be accurately laid out upon the pipe P for any angle from 0 to 90°. Towards the ends of the curves 13, the distance between the curves is very small, and where such distances are small, the scales 12 merely divide the distance between the curves in half. The scales 12 are used to aid interpolation between the curves 13.

We have found that it is advantageous to mark or print certain of the curves 13 in different colors so that they may be readily recognized. For instance: the 10°, 20°, 50°, 70° and 80° curves may be printed black, with the 30°, 60° and 90° curves printed some color such as red, and the 45° curve printed still a different color, if desired. This enables the workman employing our improved protractor to readily recognize or distinguish curves which he is apt to use a great number of times from other curves which are not so frequently used.

Although, as above described, we have spoken of our cylindrical protractor as used for laying out angles upon a pipe, it will readily be understood that the protractor may be employed for determining the angle at which a piece of pipe or other cylindrical object has already been cut. By wrapping the protractor around the pipe so that its edge is coincident with the vertex of the shortest element, the angle may be determined by measuring the distance on the pipe parallel to the axis of the pipe between said edge and vertex of the longest element and superimposing this distance on the longest scale 12 on the protractor, (see Fig. 6). By interpolation, if necessary, the exact angle may be ascertained.

It will be noted that the perforations 11 are elongated in form and that some perforations are longer than others. We have so arranged the perforations, as shown in Fig. 7, as to cross each curve 13 in such a manner that there will not be two consecutive rows of perforations 11 which will not be crossed by the curve 13. Also, we have found it to be desirable to lay out the perforations, as shown, so that a large amount of marking space will be formed upon the protractor without materially weakening the sheet 10 so that the sheet 10 has sufficient resiliency to normally spring back into flattened position.

Another important use of this protractor is in laying out curves upon flexible sheet material which is adapted to be rolled from a plane into a cylindrical form. This protractor is of especial advantage to some mechanics, such as tinsmiths. It will readily be appreciated that when desiring to form an elbow between two sections of pipe which are to be formed of sheet metal, the sheet metal may be originally placed flat and the protractor superimposed upon the sheet metal. The curves necessary to provide the angle are then marked through the protractor upon the sheet metal, and the sheet cut along the curve marked thereon. When the sheet is subsequently rolled to provide the pipe or cylindrical object, it will have its end cut so as to cooperate with another pipe section formed in the same manner, to provide the desired elbow or bend.

It will be understood that various changes in the detail of construction may be made without departing from the spirit or scope of the invention as defined by the appended claims.

We claim:

1. A cylindrical protractor comprising a sheet of material having curves thereon which are developments of lines produced by the intersections of a cylinder with planes at various angles to the axis of said cylinder.

2. A cylindrical protractor comprising a perforated sheet of material having curves thereon which are the developments of lines produced by the intersections of a cylinder and planes at various angles to the axis of said cylinder, said curves intersecting the perforations in said sheet.

3. A cylindrical protractor comprising a transparent sheet of material having curves thereon which are developments of lines produced by the intersections of a cylinder and planes at various angles to the axis of said cylinder.

4. A cylindrical protractor comprising a sheet of material having curves thereon which are developments of lines produced upon a surface of revolution by the intersection of various planes therewith, which planes are at various angles to the axis of revolution.

5. A cylindrical protractor comprising a perforated sheet of transparent bendable material having curves thereon which are the developments of lines produced upon a surface of revolution by the intersection of various planes therewith, the planes being at various angles to the axis of revolution.

6. A protractor comprising a perforated sheet of material having indicating means thereon whereby marks may be made through the sheet on a surface therebeneath which will be on curves which are developments of lines produced on a surface of revolution upon the intersection of planes therewith which are arranged at various angles to the axis of revolution.

7. A cylindrical protractor comprising a perforated sheet of flexible, transparent material adapted to be wrapped around a cylindrical object, there being curves printed upon said sheet between the perforations, some of said curves being colored to distinguish them from other curves.

8. A cylindrical protractor comprising a perforated, flexible sheet of material adapted to be wrapped around a cylindrical object, there being scales marked upon said sheet between said perforations.

9. A cylindrical protractor comprising a flexible sheet of transparent material adapted to be wrapped around a cylindrical object, there being perforations formed upon said sheet, curves printed upon said sheet between said perforations, and vertical scales printed upon said sheet between said perforations, said scales crossing said curves.

10. A cylindrical protractor comprising a flexible sheet of transparent material adapted to be wrapped around a cylindrical object, there being perforations formed upon said sheet, curves printed upon said sheet between said perforations, vertical scales printed upon said sheet between said perforations, and means for securing said sheet of material around the cylindrical object.

11. A cylindrical protractor comprising a flexible sheet of transparent material adapted to be wrapped around a cylindrical object, there being perforations formed upon said sheet, curves printed upon said sheet between said perforations, vertical scales printed upon said sheet between said perforations, and means for securing said sheet of material around the cylindrical object, said means comprising straps secured to the top and bottom edges of said sheet.

In testimony whereof we have signed our names to this specification.

NELSON I. CAMPBELL.
ABRAHAM M. HERBSMAN.